June 12, 1956  M. W. MORRIS  2,750,138
CHRISTMAS TREE MOUNTING MEANS
Filed Jan. 23, 1948  2 Sheets-Sheet 1
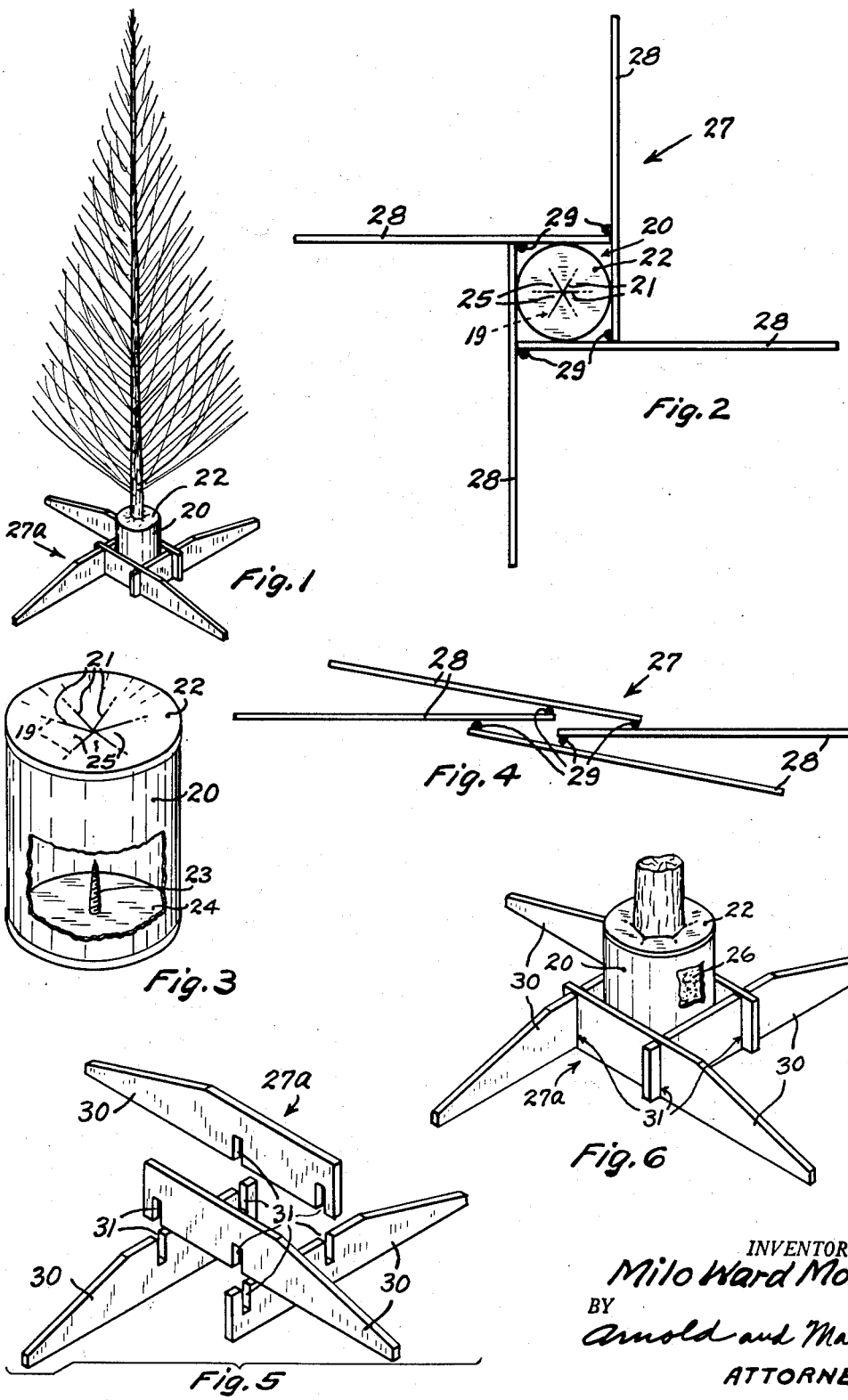
INVENTOR.
Milo Ward Morris
BY
Arnold and Mattis
ATTORNEYS June 12, 1956  M. W. MORRIS  2,750,138
CHRISTMAS TREE MOUNTING MEANS
Filed Jan. 23, 1948  2 Sheets-Sheet 2

INVENTOR.
Milo Ward Morris
BY
Arnold and Mathis
ATTORNEYS

United States Patent Office 2,750,138
Patented June 12, 1956

2,750,138

CHRISTMAS TREE MOUNTING MEANS

Milo Ward Morris, Seattle, Wash.

Application January 23, 1948, Serial No. 3,954

10 Claims. (Cl. 248—44)

My invention relates to providing a Christmas tree with mounting means.

More particularly, my invention relates to providing a Christmas tree with a mounting means characterized by the following features:

(a) Its inexpensive and economical production;

(b) Its simplicity of application by the consumer, requiring no tools;

(c) Its applicability to a Christmas tree when the mounting and the tree are bought separately, or which may be purchased assembled on the Christmas tree confined in a carton—a part of the mounting means functioning to maintain the tree in contact with moisture during shipment;

(d) Having a part of the mounting means in the form of a liquid holder and such holder to be engaged by a collapsible stand for maintaining the tree erect— the holding means being of a liquid retaining form whereby the butt portion of the tree may be held in water and the needles of the Christmas tree may be maintained green for fire resisting and the market period extended for what is otherwise a perishable product; and (e) Said liquid holder having a radially cut and concave top for self-centering and self-conforming to the tree contour and to facilitate supplying water to the holder, thereby providing a substantially closed top affording slow evaporation and excluding articles from falling therein.

A primary object of my invention is to provide an article of manufacture which meets all of the above requirements and provides the advantages set forth.

A great deal of criticism has developed respecting the use of Christmas trees on account of the fire hazards which develop when the tree has been erected for three or more days and has become dried. Under such conditions, the pitch in the needle like leaves becomes explosive, as it were, and if a fire starts, one needle after another bursts quickly into flame. A primary object of my invention is to maintain the needles in a green condition which renders them of a non-explosive and fire resisting character when they are thoroughly saturated with moisture.

Furthermore, a primary object of my invention is to conserve our natural evergreen forest. It is claimed that some sixty million Christmas trees are cut annually and that of this number, twenty million are estimated to be burned and thrown away without being employed for Christmas purposes.

It is the purpose of my invention to combine in one device the means for preserving the tree with its mounting means. Since the trees are of a perishable nature and character, and their needles become dry and fall off only a few days after being cut, when kept in heated rooms or shipped to hot dry climates, it is important that their useful period after being cut should be prolonged. Accordingly, it is the purpose of my invention to provide a means for maintaining the tree green for a prolonged period so that the marketing of the product is not confined to an exceedingly short period just previous to Christmas. Also it is the purpose of my invention to provide a means for the butt portion of the tree to be kept in contact with moisture during shipment and in contact with water after purchase by the retail purchaser and thereby the tree may be kept in readiness for Christmas for a matter of weeks for use at Christmas. It is a further purpose of my invention to bevel cut the butt portion of the tree in such a manner as to facilitate absorption of moisture by the tree.

Forestry departments of evergreen growing states are considering measures for stopping the great wastefulness incident to the cutting of Christmas trees. Accordingly, in the near future, it may be that a Christmas tree will have to be ordered by the retail customer prior to its being cut.

The above mentioned general object of my invention, together with others inherent in the same, are attained by the mechanism illustrated in the following drawings, the same being preferred, exemplary forms of embodiment of my invention, throughout which drawings like reference numbers indicate like parts:

Figure 1 is a view in perspective showing a Christmas tree mounted in accordance with my invention;

Fig. 2 is a plan view of the liquid holder and the collapsible stand for holding the same;

Fig. 3 is the view in perspective of the liquid holder means having a tree self-centering top means with radially directed cuts and a part broken away to show the tree butt anchoring means;

Fig. 4 is a view of the mounting stand partially collapsed;

Fig. 5 is an exploded view of a stand provided with rabbet cuts for quick assembly.

Fig. 6 is a view of the rabbet form of stand with all corners interlocked and engaging a liquid holder having a fragment of a tree therein.

Figures 10, 13:
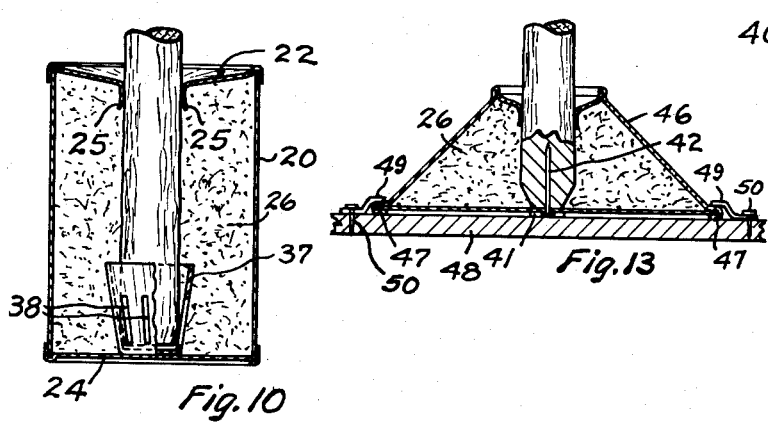
Fig. 10 is a sectional view showing a self-centering means for the butt end of a tree in the bottom of a liquid holder.
Fig. 13 is a cross sectional view, with parts in elevation, showing a receptable of frustro-conical shape for the butt end portion of a Christmas tree.
Figure 11:
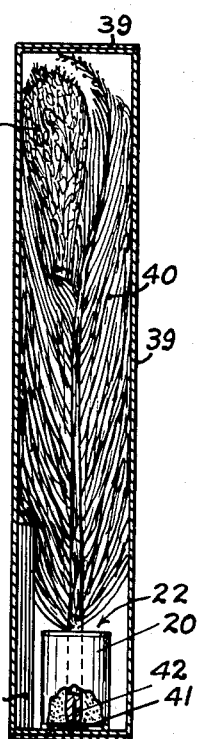
Fig. 11 is a longitudinal sectional view of the sealed moisture tight or moisture proof carton containing the Christmas tree with the liquid mounting holder attached to the butt end portion of the tree and the collapsed stand held in position by the resiliency of the branches of the Christmas tree pressing against the side of the carton.
Figure 12:
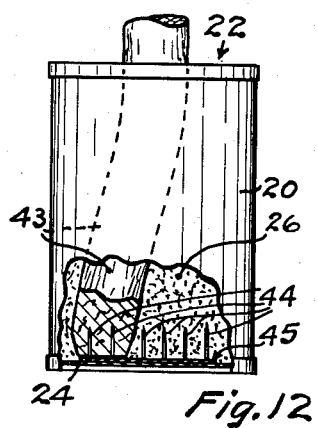
Fig. 12 is a view in elevation, with parts in section, showing a liquid holder which is provided with means for engaging and holding the butt of a tree that has a crooked butt end portion.

A holder 20 provided for receiving the tree is preferably a metal container or can provided with radially directed cuts 21, extending from the axis of the can in the top 22 of the can. "Receiving the tree" by a container or can involves preparing the butt of the tree to provide a butt end portion. This preparing of the butt end portion may include trimming off the lower branches so the container or can may be applied, and/or providing a bevelled cut at the butt of the tree as shown in Figs. 1, 2, and 13. The can top 22 is preferably provided in a concave form as respects the axis of the can. In the bottom of the can is preferably provided a tree butt end receiving means 23. This may be in the form of a screw soldered or welded to the bottom 24 of the can. Instead of the screw, a nail may be employed. However, by using a screw, a hammer is rendered unnecessary in mounting the tree and this is important in instances where the mounting of the tree is done by the person using the same. This is especially true for those living in apartment houses and who seldom have tool equipment. Also the butt end of the tree can be held in other ways as illustrated in Figs. 10 and 12 and hereinafter described.

In mounting a tree in a holder 20 the butt end of the tree is pressed through the top of the can or the can is pressed top first over the butt end portion of the tree thereby forcing downwardly the V-shaped portions 25 formed between the radially directed cuts 21. It will be remembered that tree trunks are seldom of a true circular form. They may often have an oval form. Manifestly, by providing the radial cuts 21, a self-centering means and self-shaping opening is provided for this portion of the holder 20 in gripping the tree. By providing the V-shaped portions, 25, it is manifest that these will be bent to this degree by reason of the shape of the tree and thereby provide a self-centering opening to receive the tree trunk. Such an arrangement also has the beneficial feature of retaining the closed character of the top 22, thereby acting as a container to hold water and moisture absorbent material, as well as strengthen the means as a holder. It will be understood that instead of having cuts 21 extend entirely through the metal, that such cuts may extend only partially through the thickness of the top of the can 22 and thereby provide weakened lines which may be broken or torn as the tree butt is pressed therethrough. A preferred form of can top is provided by making the cuts 21 relatively short and by weakening the metal outwardly from and in prolongation of these cuts as indicated by dotted lines 19. Thus the cuts 19 can be only long enough to provide an opening for the smallest tree for which the can is intended. Larger trees will tear the can along weakened lines 19 and the can top will always fit the tree snugly. Thus loss of moisture is prevented. If the form of the tree trunk does not too greatly depart from a true circle, then the tree and the can may be relatively rotated so as to screw the butt retaining means 23 into the tree. The portions 25 being resilient will permit of such twisting.

The holder 20 is self conforming to trees of different size and shape but is of standard external size for trees within a limited range. This makes it possible to use tree supports or collapsible stands of standard size, irrespective of variations in the size and shape of tree butts, with the assurance that the holders 20 will always fit the collapsible stands perfectly.

In the holder means 20 is preferably disposed peat moss 26 or cellular or granulated material of a moisture retaining character. This may be provided with water by pouring water into the concave hollow top 22, which will thereupon run down through the cuts 21 of the top 22. The holder 20 is adapted to be supported by a collapsible stand, such as the stand 27 shown in Figs. 2 and 3 or the stand shown in Figs. 1, 5 and 6. The central portion of the stand forming the open square operates to reinforce the relatively weak and thin wall holder 20 as to its sides and top 22.

The stand 27 may be of a foldable character by having four leg members 28 secured together adjacent their end portions by hinge like means such as staples 29. These hinge like means are provided first on the outside of one leg member and alternately on the inside of the next leg member so that the stand may be folded flat as indicated in Fig. 4, in which the stand is partially collapsed. This provides a collapsible stand which will occupy little space in shipment and storage.

Another form of collapsible stand 27a is shown in Fig. 5, where leg members 30 have rabbet openings 31. These rabbet openings 31 are provided in the leg members 30 alternately extending downwardly from the upper edge of one leg member and upwardly in the leg member to be received by the first member, thereby providing a stand which may be readily assembled without any tools.

Figure 8:
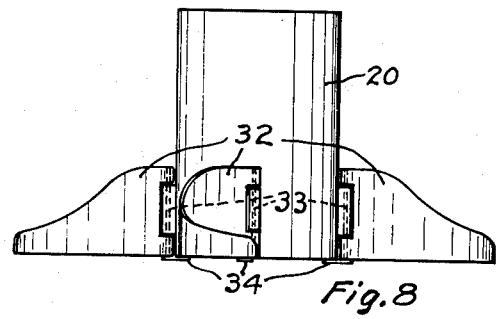
Fig. 8 is a view in elevation of the modified form shown in Fig. 7.
Figure 7:
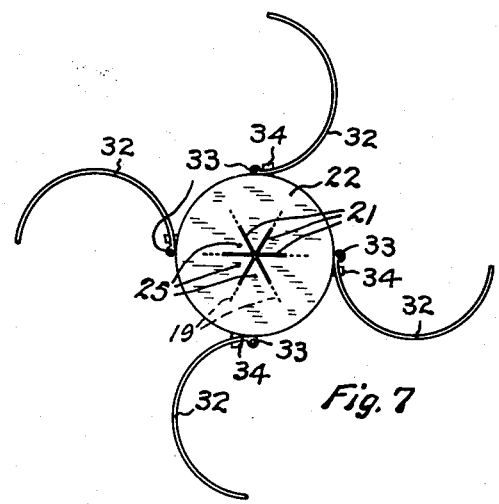
Fig. 7 is a view, in plan, of a modified form of the liquid holder having stand collapsible mounting means secured thereto.

A modified form of stand may be provided as set forth in Fig. 7, where concave metal leg members 32 may be joined by pin hinges 33 to the holder 20. When these are collapsed, they conform to the round circumference of the holder 20 and when extended they provide leg members which may be held in extended position by resilient catch members, 34.

Figure 9:
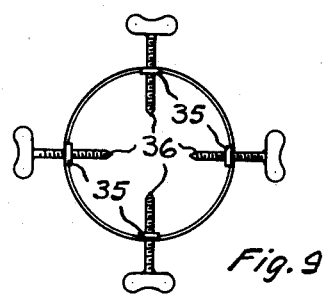
Fig. 9 is a modified form of the top mounting means for the liquid holder.

In Fig. 9, a modified form is shown for centering the tree. This comprises internally threaded lugs 35 welded or soldered to the top of the can at 90 degree intervals. Through these lugs 35 extend thumb screws 36. This form of can may have no top or this may be in conjunction with the concave top with the radially directed cuts 21.

In Fig. 10, a modified form of butt receiving means 37 comprises a frustrum or cone shaped cup which is soldered or welded to the bottom 24 of the can 20 at the axis thereof. Preferably, the tree will be provided with a bevel cut which will conform to the interior cup of 37. This form of means 37 is preferably provided with vertically directed slots 38 to permit the passage of moisture or liquid therethrough.

Fig. 12 shows a tree butt holding means particularly well adapted for engagement with the butt of a tree which has a crooked butt portion 43. In this construction a plurality of upwardly protruding spikes 44 are secured to the bottom 24 of the can. This may be done by mounting the spikes in a plate 45 and securing the plate 45 to the bottom 24 of the can. The spikes 44 are spread over a large enough area so that when a tree having a crooked butt portion 43 is positioned in the can 20 and aligned with said can for correct balance of the tree some of the spikes 44 will enter the butt portion of the tree even though this butt portion is badly off center as respects the can. This construction is advantageous in that it makes it possible to use trees having crooks near the butts thereof without cutting off the crooked butt portions and thus undesirably shortening the trees.

Fig. 13 shows another tree butt holding means in the form of a receptable 46 of truncated cone shape, preferably made of sheet metal, and having a flange 47 around its bottom edge. The top of the receptable 46 is preferably concave in shape and is slotted in the same manner as the cans 20, previously described, for the reception of the butt portion of a tree. The flange 47 is used as a means by which the receptable 46 can be secured to a support 48, such as a mounting board or floor, as by clips 49 and screws or nails 50.

Preferably the butt end portion of the trees are bevel cut or conically tapered as shown in Figs. 10, 11, 12 and 13, to remove some of the bark and wood. This better exposes the longitudinally directed channels of the tree and facilitates absorption of moisture by the tree.

In Fig. 10, a container or carton 39, sealed moisture tight, is provided for shipping the Christmas tree with its branches 40 compressed to fit within the container 39. The holder 20 is preferably secured to the tree at the time of preparing for shipment. In this instance, the butt receiving means may be a nail 42 having a washer 41 of fibrous material as felt or leather to prevent any leakage. It will be understood that driving the nail through the bottom of the can and into the butt of the tree will cause small portions of the metal to be driven into the butt of the tree and provide a liquid tight seal. However, the washer 41 will act as further assurance against leakage. The nail 42 may also be soldered or welded in position prior to being applied to the tree. The holder 20 is preferably provided with moss, moisture ladened peat or granular material such as sawdust 26.

Also there is placed on the container a collapsible stand, such as stand 27a.

Also before the tree is placed in the carton 39 there is preferably placed in the upper end portion of the branches 40 of said tree a bunch 40¹ of green foliage, such as spruce, cedar, mistletoe and the like. This bunch of greens in itself contains considerable moisture. Also it helps to form a more compact mass of greens in the upper end portion of the carton and this helps in keeping the Christmas tree green. This mass of greens 40¹ also bends the top end portion of the main stem or trunk of the tree sidewise and presses the upper branches of the tree more firmly against the carton 39 thus tending to prevent longitudinal movement of the tree in the carton in handling and shipment. All branches and parts of the tree that are bent away from their normal position while the tree is in the carton will straighten out and assume their normal positions a short time after the tree is removed from the carton.

*Mode of operation*

Much of the mode of operation of the device and method of packing constituting my invention has been set forth above. By packing the tree in a moisture sealed and tight container 39, it is apparent that the tree will be kept from drying out even if no moisture is provided within the holder 20. The leaves of an evergreen tree take in moisture by respiration and by providing the sealed container, it is manifest that any moisture which is given off by the tree is confined and maintains the green color of the tree and prevents it from drying out. By adding moisture ladened peat moss or other moistened granular material 26 to the holder 20 and imbedding the tree in this, as described for the container, it is manifest that the tree will be supplied with moisture throughout the period of shipment. This renders the tree safe against drying out over a prolonged period, and when the tree is unpacked, further moisture may be added to the can at or after the time of unpacking and mounting in the stand 27 or 27(a). This changes a perishable product into one which is relatively non-perishable for the period of time involved. Instead of the Christmas tree marketing period being limited to a period of relatively short duration, it can now be made almost indefinite so far as the shipping and use is concerned. By maintaining the freshness and green character of the tree, as herein set forth, the tree is made highly fire resistant.

The bunch of greens, 40¹, when disposed in the upper part of the carton, operates to deflect or bend the upper part of the tree trunk. This bend in the trunk provides an extra cushioning effect for the tree to keep it in place in the carton. Ofttimes, there are small buds in the upper ends of the tree branches and it is important that these be protected. Placing the upper portion of the tree trunk with a bend in it makes it grip tighter to the sides of the container, thus helping to prevent the tree from sliding endwise in the carton 39 with possible injury to the tree top.

The articles of manufacture comprised in the carton and tree are characterized as one feature by the fact that the heavier limbs in the lower portion of the tree exert a greater outward pressure on the walls of the carton, such that the carton longitudinally is substantially divided into two compartments as a shipping container. This dividing of the carton longitudinally, provides for maintaining a heavy item like the collapsed stand 30 in the base and also provides for keeping the readily injured bunch or bouquet of greens 40¹ in the top part of the container. Thus, injury of the bouquet or bunch 40¹ is prevented.

It is well known that a green tree does not take fire as quickly as one that has become dried. In the case of evergreen trees, when the tree becomes dry, the needles, even though they have not reached the falling stage, have their resin confined and form the basis for an explosive flame when ignited. This explosive character is entirely eliminated by my invention for the period in which a Christmas tree is usually in use by maintaining moisture laden foliage. In general, my invention provides a substantial, natural resource conservation means as the trees may be ordered in advance of cutting and only so many trees need be cut as are ordered and the great loss presently allowed stopped. In heavily populated areas, which ordinarily are only reached after prolonged periods of shipping after cutting, the advantages of my invention are of particular importance.

When shipments are made on flat cars, or even in closed cars, from sections where the trees are grown to sections where the temperature is relatively high in hot, dry climates, the trees become dried out in a matter of hours after unloading and setting up in the lots for distribution. While the trees are in packed condition in the freight cars, and the individual branches are not exposed except on the surface, they are not so seriously affected but as soon as they are unloaded and set up in the distribution lots for sale, the deterioration is exceedingly rapid. This has resulted in great complaints on the part of the consumer and in great wastage of the trees.

A match applied to a green leaf will sputter and then go out and will not ignite the adjoining leaves, whereas in the case of a tree that is died out, the explosive character of the pitch in the dried leaf or needle ignites the adjoining needles and has a chainlike reaction, which creates a very dangerous fire hazard.

Furthermore, the tree is characterized by the fact that it fills the room with a pine scent, which evidences very definitely the freshness of the tree.

Obviously, changes may be made in the forms, dimensions, and arrangement of the parts of my invention, without departing from the principle thereof, the above setting forth only preferred forms of embodiment.

I claim:

1. The combination of a Christmas tree and means for supporting the tree in erect position secured to the butt end portion thereof, comprising a Christmas tree having a trimmed butt end portion; and a container secured to said butt end portion, said container comprising top, bottom, and side walls adapted to confine therein moisture absorbing material, said bottom wall having fixed tree butt anchoring means interiorly thereof and engaging said butt end, and said top wall formed of resilient sheet material having cuts radiating from the center thereof providing yielding V-shaped sections, at least the inner end portions of said sections being bent downwardly and disposed along said butt portion by the insertion of the butt end through the top wall in self-centering relation with said container, the edge of the opening in the top wall and the bent sections thus formed being shaped and fitted over an extended peripheral surface of the individual inserted butt portion and in contact therewith to laterally brace the same and cooperating with the anchoring means to hold the Christmas tree erect.

2. The combination of claim 1, wherein the container is made of sheet metal.

3. The combination of claim 1, wherein the container is made of light sheet metal and is cylindrical in form.

4. The combination of claim 1, wherein the Christmas tree has a bevelled butt end portion to facilitate insertion through the top wall of the container.

5. The combination of claim 1, wherein the central portion of said top wall is depressed to form a funnel to facilitate adding water to the container.

6. The combination of claim 1, further comprising a stand comprising supporting members extending along and tangentially from a central space, applied to said container assembled on said Christmas tree, the walls of said space extending upwardly and embracing the side wall of said container and reinforcing the same as well as the top of the container.

7. The combination of claim 1, wherein the radiating cuts comprise slits radiating from the center of the top wall and weakened lines extending toward the edge of the top wall forming continuations of the slits.

8. The combination of claim 1, wherein the cuts terminate inwardly from the edge of the top wall, leaving between the ends of said cuts and the side wall of the container an annular integral portion of said cover which strengthens the central portion containing the cuts.

9. The combination of a Christmas tree and a device for supporting the tree in erect position secured to the butt end portion thereof, comprising a Christmas tree having a prepared butt end portion; the device comprising a container secured to said butt end portion, said container comprising top, bottom, and side walls adapted to confine therein moisture absorbing material, said bottom wall having fixed tree butt anchoring means interiorly thereof and engaging said butt end, and said top wall formed of resilient sheet material having cuts radiating from the center thereof providing yielding V-shaped sections, at least the inner end portions of said sections being bent downwardly and disposed along said butt portion by the insertion of the butt end through the top wall in self-centering relation with said container, the edge of the opening in the top wall and the bent sections thus formed being shaped and fitted over an extended peripheral surface of the individual inserted butt portion and in contact therewith to laterally brace the same and cooperating with the anchoring means to hold the Christmas tree erect.

10. The method of uniting a Christmas tree with means for supporting the tree in erect position secured to the butt end portion thereof, comprising the steps of removing the bottom limbs of a Christmas tree in providing a trimmed butt end portion; forming a moisture tight can-like container having top, bottom, and side walls, at least the top wall being of resilient sheet material, with anchor means on the inner face of the bottom wall; cutting through the top wall of said container along lines extending radially from the center thereof to provide central V-shaped sections; inserting the said butt end portion of said tree axially of said container through the top wall until it engages the anchoring means on the bottom wall, and thereby causing said sections to yield inwardly to automatically self-center said butt end portion in the container, the inwardly bent sections forming an opening through the top wall shaped and fitted to an extended peripheral surface of the butt portion of the tree.

References Cited in the file of this patent

UNITED STATES PATENTS

| Number | Name | Date |
|---|---|---|
| 649,785 | Weinert | May 15, 1900 |
| 783,287 | Kroder | Feb. 21, 1905 |
| 982,866 | Poppendieck | Jan. 31, 1911 |
| 1,270,062 | Schulz | June 18, 1918 |
| 1,394,391 | Woolsey | Oct. 18, 1921 |
| 1,528,883 | Lindquist | Mar. 10, 1925 |
| 1,570,403 | Ripczinske | Jan. 19, 1926 |
| 1,593,785 | Wilson | July 27, 1926 |
| 1,598,362 | Brice | Aug. 31, 1926 |
| 1,895,717 | Kelley | Jan. 31, 1933 |
| 1,931,376 | Cosner | Oct. 17, 1933 |
| 1,991,478 | Wedge | Feb. 19, 1935 |
| 2,011,778 | Sebell | Aug. 20, 1935 |
| 2,017,308 | Elmer | Oct. 15, 1935 |
| 2,020,663 | Stupleford | Nov. 12, 1935 |
| 2,044,192 | Templin | June 16, 1936 |
| 2,218,157 | Seidel | Oct. 15, 1940 |
| 2,464,593 | Lorenzen | Mar. 15, 1949 |

FOREIGN PATENTS

| | | |
|---|---|---|
| 6,505 | Great Britain | of 1913 |